United States Patent [19]

Zandee

[11] Patent Number: 4,629,990
[45] Date of Patent: Dec. 16, 1986

[54] METHOD AND APPARATUS FOR CORRECTING THE RELATIVE MOTION OF A TRANSMITTER AND A RECEIVER IN AIRBORNE ELECTROMAGNETIC PROSPECTING

[75] Inventor: Alexander P. L. M. Zandee, Rijswijk, Netherlands

[73] Assignee: Shell Internationale Research Maatschappij, B.V., Netherlands

[21] Appl. No.: 555,704

[22] Filed: Nov. 28, 1983

[30] Foreign Application Priority Data

Dec. 17, 1982 [GB] United Kingdom ................ 8235950

[51] Int. Cl.$^4$ ........................ G01V 3/165; G01V 3/16
[52] U.S. Cl. ..................................... 324/330; 324/335
[58] Field of Search .................. 324/330, 334, 335, 357

[56] References Cited

U.S. PATENT DOCUMENTS

| | | | |
|---|---|---|---|
| 2,623,924 | 12/1952 | Cartier et al. | 324/330 |
| 2,642,477 | 6/1953 | Puranen et al. | 324/335 |
| 2,731,596 | 1/1956 | Wait et al. | 324/335 |
| 2,903,642 | 9/1959 | Seigel | 324/330 X |
| 2,955,250 | 10/1960 | La Motte Shaw et al. | 324/335 X |
| 3,382,428 | 5/1968 | Sherwood et al. | 324/357 |
| 3,548,299 | 12/1970 | Duroux et al. | 324/335 |
| 3,551,798 | 12/1970 | Enenshtein et al. | 324/335 |
| 3,622,970 | 11/1971 | Sayous | 340/15.5 AC |
| 3,967,190 | 6/1976 | Zonge | 324/362 |

FOREIGN PATENT DOCUMENTS

| | | |
|---|---|---|
| 490249 | 4/1976 | Australia . |
| 1007296 | 3/1977 | Canada . |
| 17682 | 4/1979 | European Pat. Off. . |
| 0087271 | 2/1983 | European Pat. Off. . |
| 899608 | 6/1962 | United Kingdom . |
| 945365 | 12/1963 | United Kingdom . |
| 1011604 | 12/1965 | United Kingdom . |
| 1239953 | 7/1971 | United Kingdom . |
| 1370187 | 10/1974 | United Kingdom . |

Primary Examiner—Gerard R. Strecker
Attorney, Agent, or Firm—Pravel, Gambrell, Hewitt & Kimball

[57] ABSTRACT

A method and apparatus for improving signals used for detecting conductive bodies in an area by means of an airborne electromagnetic survey system, comprising the steps of generating and transmitting an AC primary field signal, the frequency spectrum of which comprises a DC component or a low frequency component, and radiating this primary field signal to the said area and receiving induced secondary field signals which are generated by the said conductive bodies and further comprising the step of processing the received secondary field signals and representing the processed signals in order to derive information whether or not conductive bodies in the said area are present.

10 Claims, 5 Drawing Figures

METHOD AND APPARATUS FOR CORRECTING THE RELATIVE MOTION OF A TRANSMITTER AND A RECEIVER IN AIRBORNE ELECTROMAGNETIC PROSPECTING

The invention relates to the field of minerals exploration. One of the commonly used prospecting methods is the airborne electromagnetic survey. Such a survey is based on the fact that concentrated ore deposits, for example those containing copper, zinc or lead etc., often display an electrical conductivity contrast with the surrounding material. The contrast is detected by actively irradiating the ground with a transmitted alternating current magnetic field (primary magnetic field). This primary magnetic field generates eddy currents in the subsurface. Their amplitude is proportional to the local conductivity. The secondary field resulting from the eddy currents is continuously measured. This provides an excellent tool for observing changes in the earth's resistivity from place to place and to obtain information whether ore deposits are present.

Usually, pick-up coils are used as a receiver for detecting the magnetic field although other devices such as squids can serve the same purpose. Such detectors can be rigidly connected to a transmitter. In such cases the distance from transmitter to receiver tends to be rather small. In practice, to increase this distance, receivers, for example magnetometers are often towed underneath an aircraft by a cable of a few hundred feet long.

The secondary fields generated by conductive ore material are generally extremely small compared with the primary field. Receivers therefore need to be very sensitive. By increasing the separation between the transmitter and the receiver one reduces the primary field component whereas the secondary field, which one wishes to measure, is relatively unaffected.

In a practical set-up the transmitter and the receiver are loosely connected by means of a tow cable.

The frequency content of the emitter signal is generally chosen to be between about 100 Hz and a few kilohertz. At the upper limit the skin effect prevents the magnetic field from penetrating into the earth. At the lower limit the penetration could be a few hundred meters but the secondary field will be relatively small since the response decreases with frequency.

Since the secondary field is measured in the presence of the primary field it is important to determine the latter very accurately. One should therefore monitor the current flowing in the transmitter loop and used this information to correct for any fluctuations.

However problems may arise, due to variation in the primary field which is caused by the relative motion of the transmitter relative to the receiver during the flight of the air craft. For current loops that generate a magnetic field, such as a magnetic dipole field the relative change in the primary field is proportional to the cube of the relative change in the separation. This mathematical behaviour adds to the seriousness of the problem. The fluctuations in primary field can, in normal flight situations, be much larger than the change in secondary field caused by large deposits of conductive minerals. One way of overcoming this problem is to use the so-called time domain systems. These use a pulse shaped transmitter signal rather than a continuous transmitter signal. The receiver measures the decay of the eddy currents after the transmitter has been turned off, i.e. when the transmitter current is zero. Since no primary field is present, relative motion is irrelevant. However, because the transmitter is switched off, less radiating power penetrates the ground on the average. This reduces the average secondary field and thus the sensitivity of the system.

It is therefore an object of the invention to provide a method of compensating for the spurious motion effect while the transmitter is still operating full time.

It is another object of the invention to provide an apparatus adapted to compensate for such disadvantageous effects.

The invention therefore provides a method for improving signals used for detecting conductive bodies in an area by means of an airborne electromagnetic survey system, comprising the steps of generating and transmitting an AC primary field signal, the frequency spectrum of which comprises a DC component or a low frequency component, and radiating this primary field signal to the said area and receiving induced secondary field signals which are generated by the said conductive bodies and further comprising the step of processing the received secondary field signals and representing the processed signals in order to derive information whether or not conductive bodies in the said area are present.

The invention also provides an apparatus for improving signals used for detecting conductive bodies in an area by means of an airborne electromagnetic survey system, comprising a transmitter of an AC primary field signal, the frequency spectrum of which comprises a DC component, or low frequency component and means adapted to receive induced secondary field signals which are generated by the conductive bodies and further comprising means adapted to process the received secondary field signals.

At DC or low frequencies (for example lower than about 20 Hz) no measurable response from eddy currents is present in all realistic situations. Therefore any changes in the magnetic field at these frequencies is related to variations in the primary field. If the value of the transmitter dipole is known, the variation of the magnetic signal at the receiver for low frequencies is directly related to the relative motion.

Although there are many ways to radiate a transmitter signal with a spectrum extending from DC to high frequencies, an advantageous embodiment of the invention considers a signal in the form of a pseudo random sequence (PRS).

The invention will now be described by way of example in more detail with reference to the accompanying drawings, in which.

Figure 1:
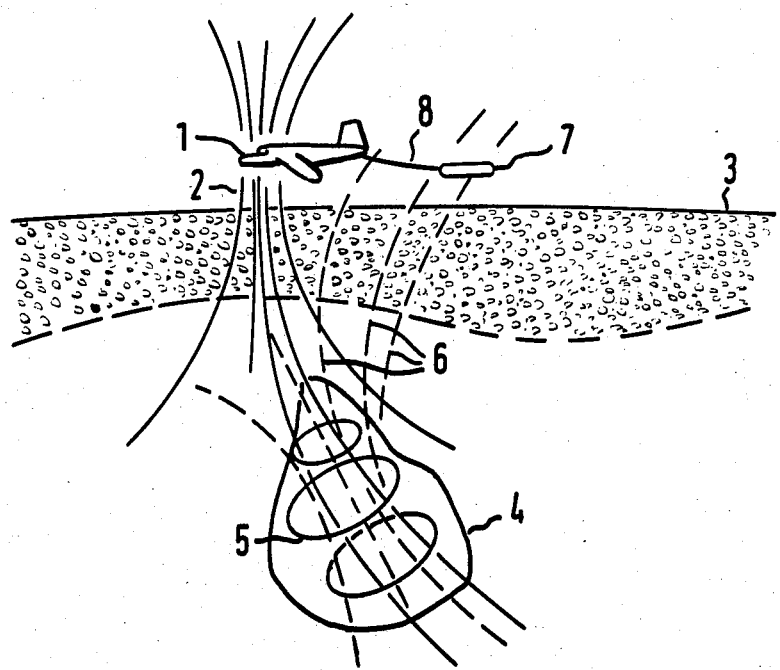
FIG. 1 represents schematically the principle of electromagnetic measurements which are used to detect subterranean ore deposits.

With reference now to FIG. 1 a suitable transmitter 1 installed at an aeroplane emits an alternating current magnetic field (primary field) 2 to the ground surface 3. When ore bodies 4 are present under the ground surface, eddy currents 5 will be generated in the subsurface. A secondary magnetic field 6 will result from the eddy currents 5 and can be measured by a suitable receiver 7. Such a receiver may be towed behind an aircraft by a suitable cable 8. The secondary field signals received by the receiver from the ore bodies are processed furthre in any way suitable for the purpose and can, for example, be represented on a trace recorder. As indicated earlier, according to the invention a transmitter signal is used, the frequency range of which is extended to direct current or low frequencies.

Figure 2:
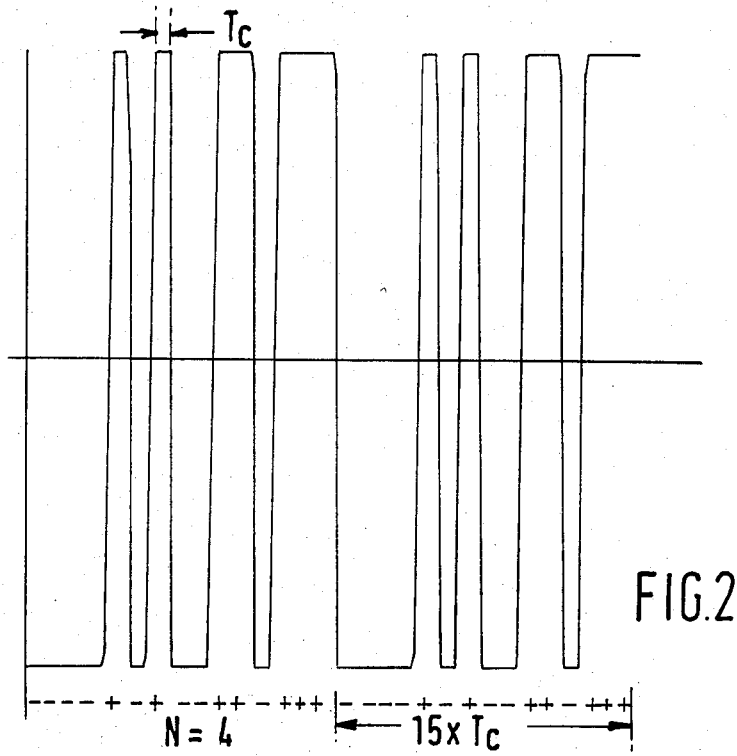
FIG. 2 represents an example of an emitted signal in the form of a pseudo random sequence (PRS)

FIG. 2 represents an advantageous transmitter signal which can be used according to the invention. FIG. 2 represents an example of a signal in the form of a pseudo random sequence (PRS). The horizontal axis represents the time, whereas the vertical axis represents the signal amplitude. Two cycles of a pseudo random signal are shown. The signal repeats after $2^N-1$ clock pulses of lengths $T_c$. (N=1, 2, 3, ...) In this example N=4. The generation of PRS signals as such is known to those skilled in the art and will not be described in detail.

Figure 3:
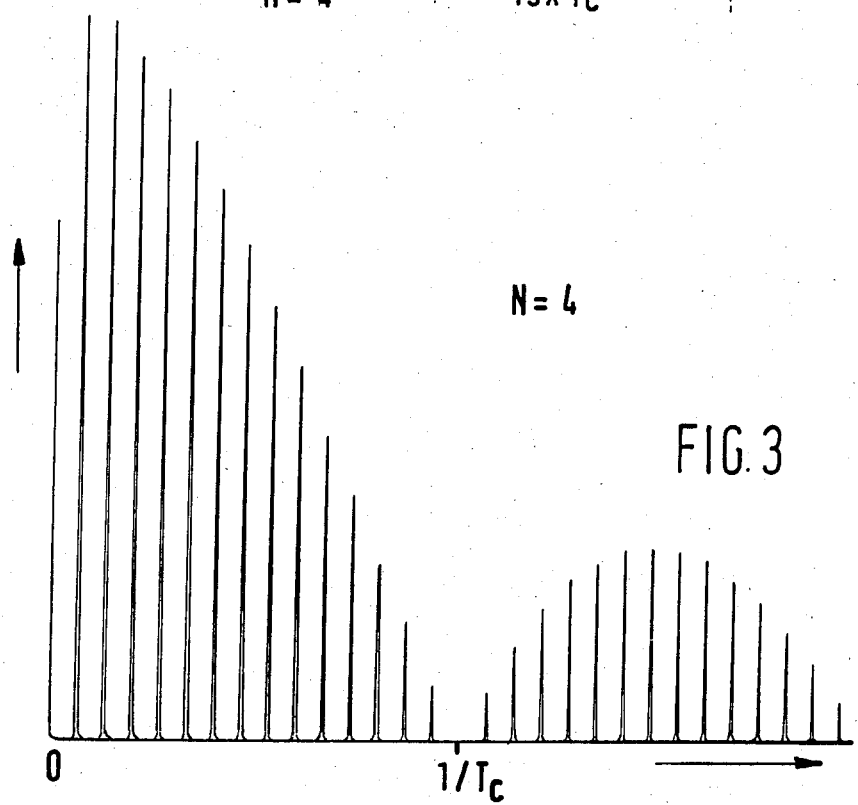
FIG. 3 represents the corresponding frequency spectrum of the signal shown in FIG. 2.

FIG. 3 represents the frequency spectrum of a PRS signal, in which N=4. The horizontal axis represents frequency, whereas the vertical axis represents amplitude. The spectrum consists of equally spaced peaks starting at Direct Current.

According to the invention the transmitted PRS waveform and the measured magnetic field at the receiver are processed further in such a way that a corrected signal is obtained which indicates clearly the presence of ore bodies. This is carried out as follows: The PRS waveform and the measured magnetic field at the receiver are cross-correlated and it can be shown that this correlation directly displays the impulse response function of the subsurface together with the response of the EM system apparatus. The technique of cross-correlation as such is known to those skilled in the art and will not be described in detail.

Figure 4A:
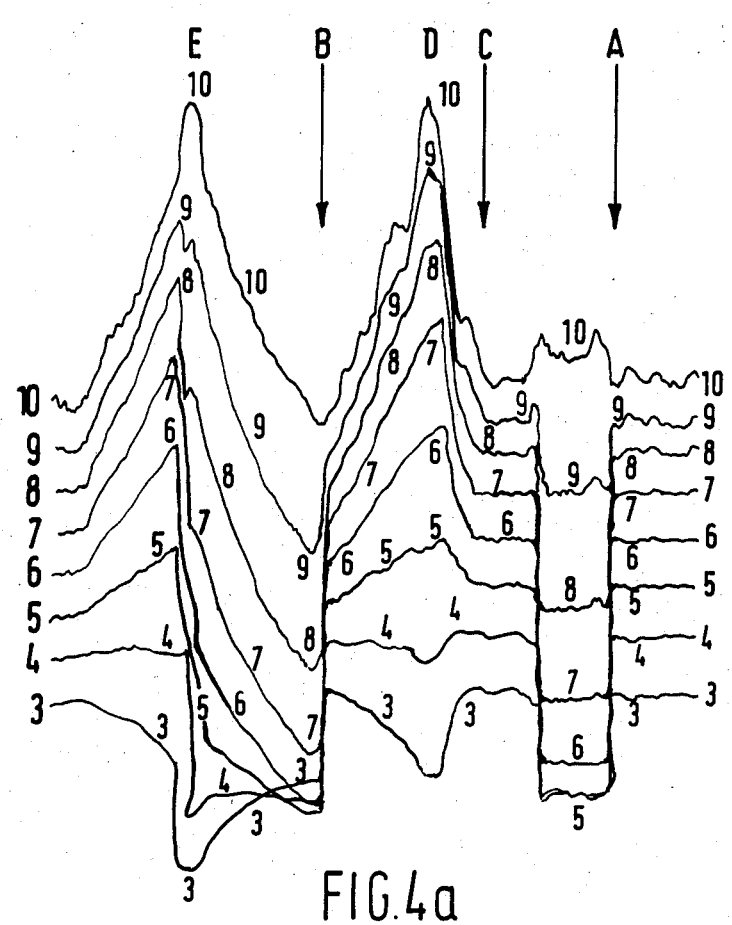
FIG. 4a represents an example of an uncorrected recorder trace, indicating the signal received by the receiver.

FIG. 4a shows on a suitable horizontal timescale, for example 0–14.7 s, recorder traces 3, 4 ... 10 of uncorrected signals for N=4. The letters A and B mark the onset of a change in the secondary field which after a while disappears again. The marker C indicates the moment that the receiver started oscillating towards the transmitter. The change in the secondary magnetic field at marker B is identical to that at marker A. The motion of the receiver, however, obscures this almost entirely.

Geophysical interpretation would lead to a misjudgment of the anomalies at the markers D and E. These anomalies, however, are not caused by any change in the subsurface resistivity at all but merely by variation in the receiver position.

According to the invention the signals beyond marker C are transformed to those (without movement noise) before this point. The results are represented in FIG. 4b.

Figure 4B:
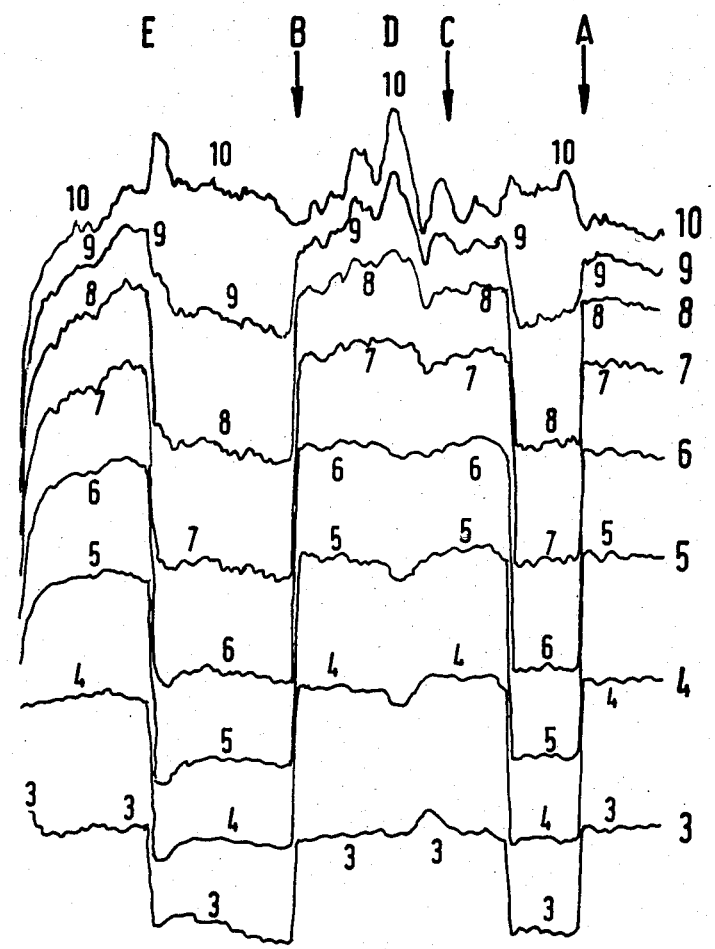
FIG. 4b represents an example of such a recorder trace after correction.

FIG. 4b represents on the same timescale as in FIG. 4a field curves 3, 4 ... 10 for N=4 after correction. The represented curves 3, 4 ... 10 have the following, frequencies respectively:

| 10 | 2600 Hz |
| 9 | 2340 Hz |
| 8 | 2080 Hz |
| 7 | 1820 Hz |
| 6 | 1560 Hz |
| 5 | 1300 Hz |
| 4 | 1040 Hz |

-continued

| 3 | 780 Hz |

The spurious anomalies at markers D and E are now negligible with respect to the real secondary field changes at A and B. The compensation can be applied after the survey is finished and the aeroplane has returned to its base.

However, it will be appreciated that, if desirable, immediate correction before plotting the data or storing them on magnetic tape is possible. This can, for example, be carried out with the help of fast (digital) computers.

Various modifications of the invention will become apparent to those skilled in the art from the foregoing description and accompanying drawings. Such modifications are intended to fall within the scope of the appended claims.

What is claimed is:

1. An airborne electromagnetic inductive survey method that compensates for relative motion between a transmitter mounted with a survey aircraft and a receiver towed behind the aircraft, including the steps of:
   continuously transmitting from the survey aircraft primary electromagnetic signals having a frequency spectrum extending from high frequency to low frequency or direct current;
   continuously receiving at the receiver composite signals produced by the transmitted primary signals and secondary signals which are generated by eddy currents induced in the earth by the primary signals, the low frequency or direct current component of the primary signals being substantially incapable of generating receivable secondary signals; and
   cross-correlating the composite received signals with the transmitted signals to compensate for relative motion between the transmitter and the receiver.

2. The method of claim 1, wherein the frequency spectrum of the primary signals extends to a frequency of less than about 20 hertz.

3. The method of claim 1, wherein the primary signals are transmitted in the form of pseudo random signals.

4. An airborne electromagnetic inductive survey apparatus for mounting with a survey aircraft and a receiver towed behind the aircraft, including:
   continuous transmitting means mounted with the survey aircraft for continuously transmitting primary electromagnetic signals having a frequency spectrum extending from high frequency to low frequency or direct current;
   continuous receiving means mounted with the receiver towed behind the aircraft for continuously receiving composite signals produced by the transmitted primary signals and secondary signals which are generated by eddy currents induced in the earth by the primary signals, the low frequency or direct current component of the primary signals being substantially incapable of generating receivable secondary signals; and
   means for cross-correlating the composite received signals with the transmitted primary signals to compensate for relative motion between the receiving means and the transmitting means.

5. The apparatus of claim 4, wherein the frequency spectrum of the primary signals extends to less than about 20 hertz.

6. The apparatus of claim 4, wherein the transmitter for transmitting the primary signals transmit pseudo random signals.

7. The apparatus of claims 4, 5, or 6, further comprising means for monitoring the transmitted primary signals at the survey aircraft so that the composite signals received at the receiver are cross-correlated with the primary signals monitored at the survey aircraft to compensate for relative motion between the receiving means and the transmitting means.

8. An airborne electromagnetic inductive survey method that compensates for relative motion between a transmitter mounted with a survey aircraft and a receiver towed behind the aircraft, including the steps of:
 continuously transmitting from the survey aircraft primary electromagnetic signals having a frequency spectrum extending from high frequency to low frequency or direct current;
 monitoring the transmitted primary signals at the survey aircraft;
 continuously receiving at the receiver composite signals produced by the transmitted primary signals and secondary signals which are generated by eddy currents induced in the earth by the primary signals, the low frequency or direct current component of the primary signals being substantially incapable of generating receivable secondary signals; and
 cross-correlating the composite signals received at the receiver with the primary signals monitored at the survey aircraft to compensate for relative motion between the transmitter and the receiver.

9. The method of claim 8, wherein the frequency spectrum of the primary signals extends to a frequency of less than about 20 hertz.

10. The method of claim 8, wherein the primary signals are transmitted in the form of pseudo random signals.

* * * * *